United States Patent Office 3,432,505
Patented Mar. 11, 1969

3,432,505
PROCESS FOR MAKING 1-HYDROXY-6-ALKOXYPHENAZINE-5,10-DIOXIDES
William Rosenbrook, Jr., Waukegan, and Arthur Charles Sinclair, Lake Bluff, Ill., assignors to Abbott Laboratories, North Chicago, Ill., a corporation of Illinois
No Drawing. Filed Mar. 17, 1967, Ser. No. 623,838
U.S. Cl. 260—267              6 Claims
Int. Cl. C07d 5/00

ABSTRACT OF THE DISCLOSURE

A novel process for making a series of 1-hydroxy-6-alkoxyphenazine-5,10-dioxides by reacting 1,6-dihydroxyphenazine-5,10-dioxide with an alkylating agent in the presence of a weakly basic aqueous solution at an elevated temperature and extracting the desired product from the reaction mixture.

BACKGROUND OF INVENTION

It has recently been reported that a particular species of Sorangium—soil-borne microorganisms classified as myxobacters—produce antibiotic substances which are capable of inhibiting a wide range of microorganisms such as various species of fungi, actinomycetes and yeasts, including Gram-negative and Gram-positive organisms (Canadian Journal of Microbiology, vol. 12, p. 221, 1966). These substances have been reported as having the structural formula

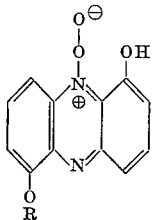

wherein R is loweralkyl having 1–4 carbon atoms; the compound wherein R is methyl being known as the antibiotic, Myxin. (See Edwards, O. E., and Gillespie, D. C., Tetrahedron Letters, 4867, 1966.) The art shows that in order to produce these substances, it has been necessary to grow cultures of Sorangium sp. (strain 3c) in a suitable culture medium and extract these substances from the culture. Such extraction procedures are, of course, quite complicated and time-consuming.

We have now found that these particular substances have the structural formula

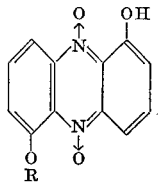

wherein R is loweralkyl 1–4 carbon atoms and having oxygen atoms at both the 5-position and the 10-position, thereby being simple 5,10-dioxides rather than N-dioxides as previously reported. In accordance with this finding, a novel synthetic pathway for making these compounds has been found.

BRIEF DESCRIPTION

This reaction involves the alkylation of the substance, Iodinin, having the formula

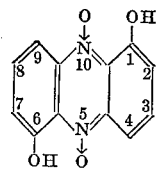

with an excess amount of a suitable alkylating agent in the presence of an alkali metal base at elevated temperatures. The time of reaction, basicity of the alkali metal base, temperature range and proportion of reactants must all be within specified ranges for the successful performance of this process.

DETAILED DESCRIPTION

The primary reactant, Iodinin, may be obtained from submerged cultures of Pseudomonas iodinum. This culture is on deposit with the American Type Culture Collection in Washington, D.C., and assigned number 9897. Iodinin undergoes mono- and di-alkylation at the 1- and 6-positions in the presence of an alkylating agent and proper reaction conditions. Several factors determine whether Iodinin undergoes mono- or di-alkylation, including the proportion of reactants, reaction time, basicity of the reaction mixture and temperature. To obtain the monoalkylated derivative, these factors must all be carefully controlled.

The proportion of alkylating agent to Iodinin should be kept in the range of about 5–25 parts alkylating agent to 1 part Iodinin; preferably, the ratio is maintained at 20 to 1 for best results. If the alkylating agent is present in amounts less than five-fold over the Iodinin, the reaction yields only very small amounts of the mono-alkylated derivative since Iodinin is not greatly reactive. If, on the other hand, greatly excessive amounts of the alkylating agent are present in the reaction mixture, Iodinin undergoes di-alkylation at both the 1- and 6-positions yielding little to none of the mono-alkylated derivative. Suitable alkylating agents include dialkyl sulfate, alkyl iodide, and alkyl tosylates. The particular 6-position R substituent desired dictates the particular alkylating agent to be used. For example, if R is to be methyl, then di-methyl sulfate or methyl iodide may be utilized.

In a similar manner, the time of reaction must be carefully controlled to avoid di-alkylation. Generally a reaction time of between 1 and 6 hours is sufficient to obtain the desired derivative, the preferred time period being between 3 and 5 hours. It is found that after 1 hour of reaction, the mono-alkylated derivative begins to appear and maximum yields of this derivative are obtained after about the fifth hour. If the reaction is allowed to continue beyond 6 hours, Iodinin continues to undergo alkylation causing greater amounts of the di-alkyl derivative to be formed.

As has been previously indicated, the reaction requires an environment of a weakly basic aqueous solution. Such environment is suitably provided by an alkali-metal base, such as sodium and potassium hydroxide having a concentration of between 0.1 and 1 molar. Within this range of concentrations, the Iodinin is ionized at primarily only one position resulting in a higher concentration of the mono-phenoxide ion and therefore improving the yield of the mono-alkylated derivative. At high molar concentration, Iodinin is ionized at both the 1- and the 6-positions resulting in a greater production of the di-alkyl over the mono-alkyl derivative; if the molar concentration falls below 0.1 M, Iodinin will not ionize sufficiently to enable the reaction to proceed efficiently.

The reaction is also intimately affected by the temperature of the reaction mixture. It has been found that a temperature range of between about 60° to about 80° C., results in good yields of the mono-alkyl derivative. Preferably, a temperature of between 68° and 72° will produce the highest yields of the desired product. If the temperature of the reaction mixture is below 60° C., little to no reaction occurs, whereas, if the temperature is raised above 80° C., Iodinin is induced to ionize at both the 1- and 6-positions resulting principally in the formation of the di-alkyl derivative.

In order to better understand this novel process, the following examples are presented to illustrate a few specific embodiments of this invention and not to limit the invention to the particular embodiments described.

Example 1.—Preparation of Iodinin

A liquid culture medium is prepared consisting of the following ingredients:

Corn steep _____grams__ 10
Peptone _____do____ 5
Glucose _____do____ 10
Calcium carbonate _____do____ 1
De-ionized water _____liter__ 1

The pH of the medium is adjusted to 7.0 and the mixture autoclaved at 120° C. for 10–15 minutes. The medium is then ready for use.

A culture of *Pseudomonas iodinum* (American Type Culture Collection, Washington, D.C., code number 9897) is seeded into the liquid culture medium and the culture is grown for several days at a temperature range of 24° to 32° C. Iodinin is insoluble in water and therefore precipitates out of the culture medium as formed. After several days of growth, the Iodinin is extracted with chloroform using about one-half of total volume of the beer.

The chloroform fraction is separated, dried and reduced in volume by a factor of 20:1 by evaporating under reduced pressure. Iodinin is redissolved in boiling chloroform and crystallized out of solution upon cooling. The Iodinin crystals are ready for further use.

Example 2.—Preparation of 1-hydroxy-6-methoxyphenazine-5,10-dioxide

In 570 ml. of 0.5M sodium hydroxide is dissolved, 570 mg. (2.13 mmoles) Iodinin and the mixture placed in a 70° C. oil bath. Three 4.5 ml. aliquots of freshly distilled dimethyl sulfate (48 mmoles) are added at one hour intervals. After 4½ hours, the reaction mixture is cooled and washed with two 500 ml. portions of carbon tetrachloride. The organic phase is discarded and the aqueous phase is extracted with three 500 ml. portions of chloroform. The chloroform extracts are combined and washed twice with 50 ml. 0.5M sodium hydroxide, once with 1 liter distilled water and dried over anhydrous sodium sulfate.

The chloroform solution is evaporated at 40° C. under reduced pressure yielding 79 mg. of the product, 1-hydroxy-6-methoxyphenazine-5,10-dioxide, as a residue.

In a manner similar to the procedure described in Example 2, other R-substituted derivatives can be produced. For example, by replacing dimethyl sulfate with an equimolar proportion of ethyl iodide under similar reaction conditions, 1-hydroxy-6-ethoxyphenazine-5,10-dioxide is produced. Similarly, other compounds having other lower-alkyl (1–4 carbon atoms) radicals in the R-position may be made in accordance with this reaction scheme.

The removal of the desired product from the reaction mixture requires the use of specific solvents in order to remove impurities. The first isolation step requires the use of a non-polar solvent immiscible with water in order to remove the di-alkyl derivative impurity. Carbon tetrachloride is generally well-suited for removing the di-alkylated derivative. Extraction of the desired product requires the use of a non-polar solvent in which Iodinin is relatively insoluble and such solvents as benzene, methylene, chloride, chloroform and ethyl acetate may be efficiently utilized. In this manner, both the excess Iodinin and the di-alkylated derivative are removed leaving the desired mono-alkylated product.

If desired, the alkali base and the alkylating agent may be continuously added to the reaction mixture to optimize final yields. Furthermore, this reaction may be run on a continuous basis by removal of the mono-alkyl derivative as it is formed and as additional amounts of Iodinin, base and alkylating agent are added.

Others may practice this invention in any of the numerous ways which will be suggested to one skilled in the art upon reading this disclosure. All such practice of the invention is considered to be covered hereby provided it falls within the scope of the appended claims.

We claim:
1. A method for preparing compound of the formula

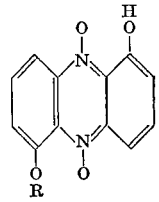

wherein R is lower-n-alkyl having 1–4 carbon atoms comprising the steps of heating 1,6-dihydroxyphenazine-5,10-dioxide with an alkylating agent selected from the group consisting of dialkylsulfate, alkyliodide and alkyl tosylate, the alkylating agent being present in an amount of from 5 moles to 25 moles per mole of 1,6-dihydroxyphenazine-5,10-dioxide in the presence of an alkali metal base solution having a molar concentration in the range of from about 0.1 to about 1.0, maintaining the reaction mixture at a temperature of from about 60° to about 80° C. for a period of from 1 to about 6 hours and extracting the alkoxy product from the reaction mixture.

2. A method according to claim 1 wherein the alkylating agent is present in the ratio of 20 parts to one part of 1,6-dihydroxyphenazine-5,10-dioxide.

3. A method according to claim 1 wherein the temperature of the reaction mixture is maintained at between 68° and 72° C.

4. A method according to claim 1 wherein the reactants are heated for a period of between 3 hours and 5 hours.

5. A method for preparing 1-hydroxy-6-methoxyphenazine-5,10-dioxide comprising the steps of heating 1,6-dihydroxyphenazine-5,10-dioxide with a methylating agent selected from the group consisting of dimethylsulfate, methyliodide and methyl tosylate, the methylating agent being present in an amount of from 5 moles to 25 moles per mole of said 1,6-dihydroxyphenazine-5,10-dioxide, in the presence of an alkali metal base solution having a molar concentration in the range of from about 0.1 to about 1.0, maintaining the reaction mixture at a temperature of from about 60° to about 80° C. for a period of from 1 to about 6 hours and extracting the methoxy product from the reaction mixture.

6. A method according to claim 5 wherein the methylating agent is present in the ratio of 20 parts to one part of 1,6-dihydroxyphenazine-5,10-dioxide.

References Cited

UNITED STATES PATENTS 2,921,937  1/1960  Gordon et al. _____ 260—267

ALEX MAZEL, *Primary Examiner.*